United States Patent [19]

Froelich et al.

[11] 3,737,876

[45] June 5, 1973

[54] METHOD AND DEVICE FOR SCANNING INFORMATION CONTENT OF AN OPTICAL MEMORY

[75] Inventors: Dieter Froelich; Wolfgang Welsch, both of Munich, Germany

[73] Assignee: Siemens Aktiengesellschaft, Berlin and Munich, Germany

[22] Filed: June 16, 1971

[21] Appl. No.: 153,568

[30] Foreign Application Priority Data

June 24, 1970 Germany....................P 20 31 320.6

[52] U.S. Cl. .......340/173 CR, 340/173 LM, 328/124

[51] Int. Cl. .............................................G11c 11/42

[58] Field of Search.................340/173 CR, 173 LM; 328/124

[56] References Cited

UNITED STATES PATENTS 3,505,654 4/1970 Birkeland ........................340/173 R 3,641,510 2/1972 Chen.............................340/173 CR 3,651,489 3/1972 Beutel...........................340/173 CR

*Primary Examiner*—Terrell W. Fears

*Attorney*—Carlton Hill, Benjamin H. Sherman and J. Arthur Gross et al.

[57] ABSTRACT

An electron beam tube for use in retrieving information from an optical memory characterized by being provided with one or more electron guns for flooding the matrix of photosensitive elements after a retrieval cycle to erase any information stored thereon prior to a subsequent retrieval cycle. The photosensitive elements of the electron tube are arranged in columns and rows corresponding to the columns and rows of the stored information of the optical memory and may include at least one row of switching diodes utilized to control the scan of the reading electron beam along the desired column.

12 Claims, 2 Drawing Figures

INVENTORS
Dieter Froelich
Wolfgang Welsch

BY Hill, Sherman, Meroni, Gross & Simpson
ATTYS.

METHOD AND DEVICE FOR SCANNING INFORMATION CONTENT OF AN OPTICAL MEMORY

BACKGROUND OF THE INVENTION

1. Field of the Invention

The present invention is directed to a method and apparatus for retrieving information stored in an optical memory utilizing an electron beam tube having means for erasing information transferred thereon.

2. Prior Art

In modern data processing, the retrieval of digital data from a storage memory is an essential task. Among the various types of storage memory arrangements there exist the optical memory in which the message or information is recorded optically and then must be retrieved optically. In optical memories, the information can be stored on foils or tapes and there has been special emphasis on using optical memories employing holograms which may be subdivided into a plurality of subholograms.

When using holograms as a memory, they are usually divided into a matrix-like arrangement of image dots with each dot containing a fixed quantity of digital data depending on whether the dot is reconstructed as a bright or dark image or an image of different light contrast. The digital information contained in an optical memory using holograms is usually arranged in a matrix of columns and rows for example 128 columns with 144 dots per column with each column representing a word. In order to obtain retrieval of information, it is desirable that an entire word will be read or the information retrieved therefrom in one microsecond.

Prior art pickup devices or tubes such as vidicon, use a deflectable electron beam which scans the entire matrix of photosensitive material to obtain the information stored in each individual element of the matrix and during scanning to recharge the element to erase the information contained therein. In retrieving information from an optical memory, it may be desirable only to scan one or more of the columns of the matrix on which the information of the particular optical memory has been projected. Thus the use of the prior art pickup tubes for retrieving information from an optical memory have raised serious problems due to the retention of information in those columns which were not scanned when retrieving only a portion of the memory projected on the matrix of the tube. Furthermore, the use of the scanning beam to erase the entire matrix increases the access time and results in higher cost for retrieving information from an optical memory.

SUMMARY OF THE INVENTION

The present invention is directed to a method and apparatus for retrieving information from an optical memory which may be stored on a film or stored in a matrix or raster of holograms by projecting the information of the memory onto a matrix or array of photosensitive elements or cells, scanning the cells by projecting a scanning beam to obtain the information contained therein and subsequently erasing the entire matrix or array of photosensitive cells with means projecting a flooding beam of electrons. The photosensitive elements are reading diodes which are arranged in columns and rows which may include a special row of switching diodes in addition to the reading diodes for connecting to a control circuit controlling the scanning beam along a line of reading diodes.

Accordingly, it is the object of the present invention to provide an improved method and apparatus for retrieving information from an optical memory.

Another object of the present invention is to provide a method and apparatus for retrieving information from an optical memory having a low cost and a short access time within the order of 1 micro second.

Other objects, features, and advantages will be readily apparent from the following description of a preferred embodiment taken in conjunction with the drawings, although variations and modifications may be effected without departing from the spirit and scope of the concept of the disclosure.

DETAILED DESCRIPTION OF A PREFERRED EMBODIMENT

Figure 1:
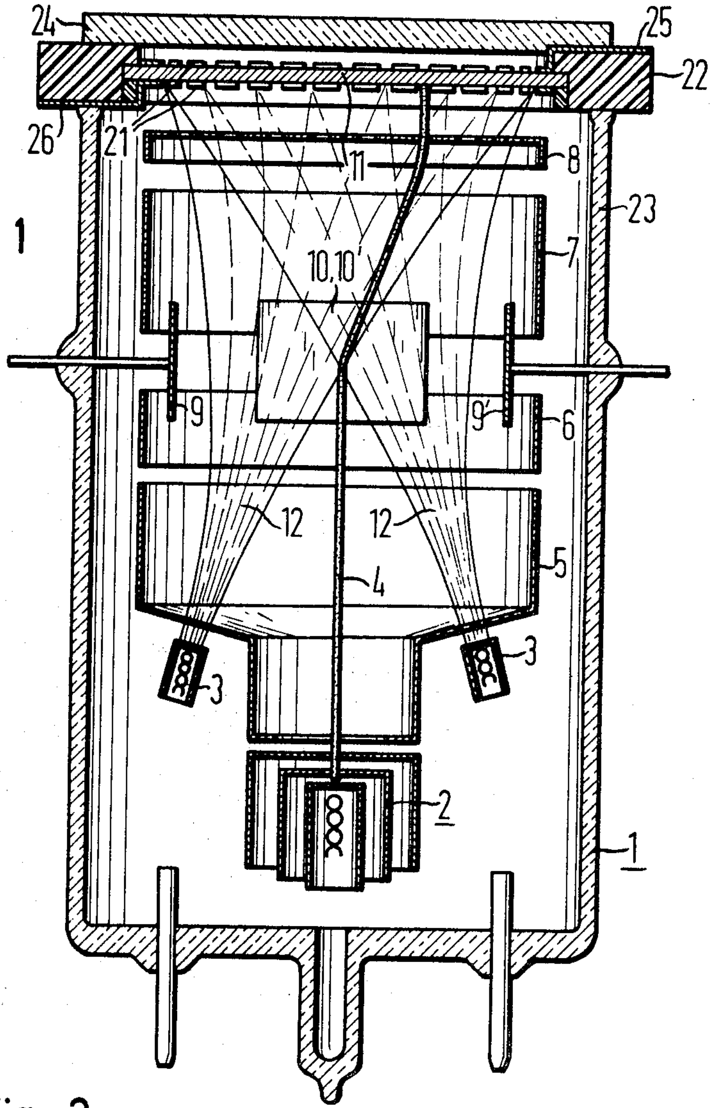
FIG. 1 represents an overall cross section of the apparatus of the present invention.

The principles of the present invention are particularly useful when utilized in an apparatus for performing a method of retrieving information from an optical memory or storage means in which the information is recorded in the form of digital data. The optical memory for recording the digital data may be a film, a hologram, or several subdivided sub-holograms. Preferably the digital data is recorded in the optical memory in the form of a matrix or raster of information elements or data arranged in a rectangular pattern of columns and rows with 128 columns and 144 elements per column.

To retrieve or read out the digital data stored in the optical memory, an electron beam tube 1 is utilized and has means, such as an electron beam gun 2 for projecting a scanning beam 4 onto a target or matrix 11 of an array of photo sensitive cells or elements and means such as electron beam guns 3, for projecting a flooding electron beam 12 onto the target 11. The electron gun tube functions in a manner similar to a gun of a vidicon and generates the scanning or reading beam 4 of electrons which is deflected electrostatically and which is focused onto a target both magnetically and electrostatically. The electron gun 2 is of a conventional construction having a cathode, a Wehnelt cylinder and an anode. Additional electrodes 5, 6, 7 and a field net 8 are used to focus the reading beam 4. To deflect the beam 4 across the target 11 of photosensitive elements, two pairs of deflection plates 9, 9' and 10, 10' having leads extending out of the envelope of the tube 1 are provided. By appropriately controlling the charge on the deflection plates, the beam 4 is deflected to scan across the target 11 during a retrieving operation.

To erase the information on the photoelements of the target 11 after completion of a scanning cycle, a plurality of electron guns 3 are provided and, as illustrated, are arranged to direct their beams 12 onto the target 11 to recharge all of the photosensitive elements such as photodiodes. In order to maintain the required short reading time, it is necessary to select in current density of the flood beams 12 of a magnitude that between two subsequent reading cycles of the scanning beam 4, the recharging of the diodes or photosensitive elements of the target 11 is carried in a blocking direction. The electron gun 3 may be designed as a diode, a triode or even a multiple electrode arrangement depending on the requirements and circumstances. The means of projecting a flood beam of electrons may be designed to utilize either a single electron gun which has an annular cathode or several guns, as illustrated, which have cylindrical cathodes.

Figure 2:
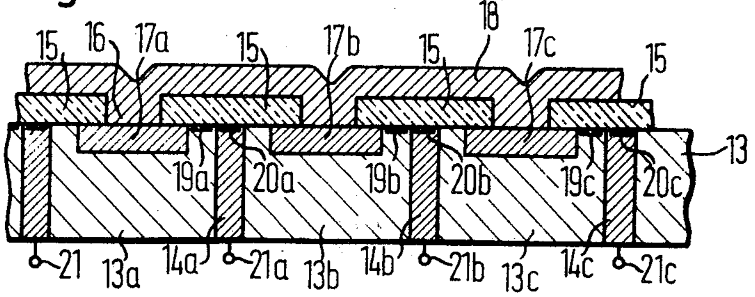
FIG. 2 shows a cross section of a photosensitive target for the apparatus.

The target 11 as illustrated in cross section in FIG. 2 is composed of a semiconductor material, for example silicon, which is differently doped in different regions. A basic disc 13 has parallel extending regions 13*a*, 13*b*, 13*c* of an N-type semiconductor material, which are separated by parallel extending regions 14*a*, 14*b* and 14*c* of P-type semiconductor material to reciprocally uncouple the N-type regions 13*a*, *b*, *c*. The P-type regions 14*a*, *b*, *c* can be P-doped parallel strips which are inserted into the disc 13 during the manufacture. The uncoupling is accomplished for example by application of a blocking voltage on specially conductive strips 19*a*, 19*b* and 19*c* and 20*a*, 20*b* and 20*c*. The strips 20*a*, *b*, *c*, are electrically connected together at the edge of the target to form a group of strips, which strips are provided in the region of the P-type semiconductors. The group, which is formed by the strips 19*a*, 19*b*, 19*c*, are provided in the N-type semiconductor adjacent to the P-type region.

The disc 13 is coated with a layer 15 of insulating material, for example silicon oxide ($SiO_2$) and is provided with holes 16 at regular intervals which holes are etched therein by a screening technique. The material of the disc 13 in the areas of the hole 16 is then subjected to a P-doping through the holes to provide semiconductor zones 17*a*, 17*b* and 17*c* of a P-type. Each of the P-type zones, such as 17*a*, 17*b* and 17*c*, form with the corresponding N-type regions 13*a*, 13*b* and 13*c* the individual photosensitive diodes. To prevent charging onto the layer 15 a conductive layer 18 is applied thereto and extends into the holes 16 to cover the P-zones 17*a*, *b* and *c* of the diodes. The conductive layer is preferably antimony trisulfide.

In operation, the two connections for the individual photodiodes consist of the electrons from the beam 4 impacting upon the layer 18 and the conductive strips 19*a*, *b*, and *c* by which the signal or information is removed. The reading out of the information operation is similar to the operation in a vidicon of the prior art. However, since the usual sequential reading and discharging of all signal elements requires much longer time in the vidicon than is desired here, the reading and charging of the diodes is carried out separately from each other. Thus, after completion of the reading out of the information transferred to the photodiodes by the reading beam 4, the entire diode matrix of the target 11 is completely recharged by means of the electron projected by the flood electron guns such as 3. This charging operation which occurs in a fraction of the time required for reading with the scanning beam 4 requires a sufficient electron density of the flood electron beam striking the target to accomplish the recharging thereof. With this arrangement it is immaterial, in contrast with the vidicon whether the reading beam recharges the diodes during reading to a completely recharged or only to a partly recharged state. Thus, the scanning beam must only have available a minimum signal current necessary for the reading operation.

The information released from the photo-diodes during the scan of the reading beam is taken off via the strips 19*a*, *b*, and *c* which along with the interconnected strips 20 are extended out of the vacuum envelope at the edge of the target 11 (FIG. 1) where they form rows of juxtaposed contact strips diagrammatically illustrated at 21*a*, *b* and *c* in FIG. 2. The target 11 is positioned in the envelope by an insulating ring 22 which carries contacts 25 and 26 alternately located on the tops and bottom side of the ring. According to the devices illustrated in FIG. 1, the ring 22 is fastened between tube envelope 23 and the front glass disc 24 by means of a glass soldering process.

Generally, the described arrangement of the deflecting plates allows for sufficiently precise and rapid utilization of the deflecting voltage to sweep the reading or scanning beam 4 along a path to project on a line or column of diodes. If for a special requirement, the normal locating of the scanning beam 4 path to project on a diode column or line is insufficient, it is possible to apply in addition to the reading diodes a special row of switching diodes on the target 11. The switching diodes with the aid of a control circuit could make it possible to direct the path of the reading beam more precisely upon the desired diode line or column to be read out thereby.

The reading out of the message can also take place in a different manner. The target contains thereby a multiplicity of diodes at a lesser interval than in the previously described target. Furthermore, the strips 19*a*, *b*, *c* and 20*a*, *b*, *c* along with the P-doped strips 14*a*, *b*, *c* of the above described embodiment are eliminated and each bit and/or image dot of the optical memory is associated with several juxtaposed diodes. For example, one image dot of a diameter of about 100 microns may have ten diodes associated with it. The signal panel for all of the photodiodes is the same and during the reading cycle, the reading beam scans consecutively one or more times in 1 micro second the photodiodes associated with the word. The association with each bit of this line is thereby determined by the position of the scanning beam in its path of travel by the phase of the voltages applied to the deflection plates controlling the sweep.

Although various minor modifications might be suggested by those versed in the art it should be understood that we wish to embody with the scope of the patent warranted hereon all such modifications that reasonably and properly come within the scope of our contribution to the art.

We claim as our invention:

1. A method for retrieving information from an optical memory having digital information recorded in the form of a dot-like raster, the steps comprising:

providing an electron beam tube having a target of a plurality of photosensitive elements disposed in an array, means for projecting a scanning beam of electrons on the target, and means for projecting a flooding beam of electrons on the array of photosensitive elements;

illuminating the raster of the optical memory and focusing the images formed by the illumination onto the array of photosensitive elements to transfer the information of the optical memory to the array of photosensitive elements;

scanning the target of photosensitive elements with the scanning electron beam to release and collect information transferred to each of the photosensitive elements from the optical memory; and subsequently flooding the entire target of photosensitive elements with electrons from the flooding beam of electrons to erase any information retained thereon so that the target of photosensitive elements is in a condition to start a subsequent retrieval cycle from an optical memory.

2. A method according to claim 1, wherein the optical memory is a raster of individual holograms arranged in columns and rows and wherein the step of illuminating includes illuminating the raster of holograms with a laser illumination to focus the hologram images on the array of photosensitive elements to transfer the information of the raster of holograms to the array of photosensitive elements.

3. A method according to claim 1, wherein the array of photosensitive elements are reading diodes arranged in rows and columns and includes a row of control sensing means comprising a plurality of switching diodes in each column of the array; and wherein the step of scanning includes comparing the output of the switching diodes of each column with the phase of the position of the scanning electron beam to control the sweep of the scanning beam along the column of reading diodes.

4. An apparatus for retrieving information from an optical memory having digital information recorded in a raster arranged in columns and rows comprising:

a target of photosensitive elements arranged in columns and rows with the target positioned on one side of an envelope for receiving information from light waves projected thereon from the optical memory;

means disposed in an envelope for projecting a scanning beam of electrons on the target of photosensitive elements;

means disposed in the envelope for collecting the information released from the photosensitive elements by the scanning means and conducting the information out of the envelope; and a means for projecting a flooding beam of electrons on the entire target of photosensitive elements to erase any information contained thereon whereby the scanning beam releases the information contained by the photosensitive element scanned thereby and the flood beam erases information on the target of photosensitive elements at the completion of the scanning operation to prepare the apparatus for a subsequent retrieval cycle.

5. An apparatus according to claim 4, wherein said means projecting a flooding beam comprises a single flood electron gun provided with an annular cathode.

6. An apparatus according to claim 4, wherein the said means for projecting a flood beam comprises an electron gun having an arrangement of at least two electrodes.

7. An apparatus according to claim 4, wherein said means for projecting the flood beam comprises a plurality of electron guns arranged to flood the target of photosensitive elements with a plurality of flooding electron beams.

8. An apparatus according to claim 4 wherein the target of photosensitive elements comprises a photosensitive target of a type having a base plate of parallel N-type semiconductor regions separated by P-type semiconductor regions, a first group of parallel metal conductor strips extending parallel to the P-type semiconductor regions with one strip associated with each of said P-type regions, a second group of metal conductive strips arranged parallel to the first group with one strip disposed with each of the N-type semiconductor regions adjacent the P-type region, said base plate having a layer of insulative material on a surface thereof with said layer having holes at regular intervals overlying the N-type regions with the surface of the base plate being doped to form P-type semiconductors at each hole to form a photo diode with the N-type semiconductor regions, said parallel P-type regions and said groups of metal conductor strips adapted to receive a blocking voltage to uncouple said N-type regions.

9. An apparatus according to claim 8, wherein said insulative layer is coated with a semiconductive layer of antimony trisulfide and said target is arranged in said apparatus with said layer facing the means projecting the beam of electrons.

10. An apparatus according to claim 8, wherein one of said groups of parallel conductive strips are electrically interconnected, and wherein said connected group and the other group of metal conductive strips extend out of the envelope.

11. An apparatus according to claim 10, wherein said strips of the other group are extended from the base plate on different sides of an insulating ring used for fastening the base plate to the envelope.

12. An apparatus according to claim 4, wherein said target of photosensitive elements comprises a plurality of reading diodes arranged in columns and rows and wherein a special row of switching diodes is provided in order to control the scanning beam during movement along a desired column by means of a control circuit.

* * * * *